United States Patent [19]

Gustavsson et al.

[11] Patent Number: 4,941,896
[45] Date of Patent: Jul. 17, 1990

[54] METHOD AND APPARATUS FOR CLEANSING GASES

[75] Inventors: Lennart Gustavsson; Leif Lindau; Lars-Erik Johansson, all of Väö, Sweden

[73] Assignee: Flakt AB, Nacka, Sweden

[21] Appl. No.: 340,294

[22] PCT Filed: Sep. 17, 1987

[86] PCT No.: PCT/SE87/00421
§ 371 Date: Mar. 31, 1989
§ 102(e) Date: Mar. 31, 1989

[87] PCT Pub. No.: WO88/01902
PCT Pub. Date: Mar. 24, 1988

[30] Foreign Application Priority Data

Sep. 17, 1986 [SE] Sweden .................................. 8603914
Jul. 6, 1987 [SE] Sweden .................................. 8702770

[51] Int. Cl.⁵ ............................................. B01D 47/00
[52] U.S. Cl. ........................................ 55/95; 55/255; 55/256; 261/77; 261/124
[58] Field of Search ........................... 55/95, 255, 256; 261/77, 124

[56] References Cited

U.S. PATENT DOCUMENTS 941,676  11/1909  Green ...................................... 55/249
1,583,141  5/1926  Greenwalt ............................. 261/124
2,832,432  4/1958  Fanton .................................. 55/249

FOREIGN PATENT DOCUMENTS 14473 of 1912 United Kingdom .................. 261/77

Primary Examiner—Bernard Nozick
Attorney, Agent, or Firm—Dann, Dorfman, Herrell & Skillman

[57] ABSTRACT

A gas cleansing arrangement comprising a vessel (1) partially filled with liquid (32) and a gas distribution means (14) beneath the liquid surface (34). The gas distribution means (14) comprises obliquely and downwardly extending distribution pipes (26) with upwardly facing inlet openings (64) for contaminated gas and a lower opening (22). The inlet openings are each connected to a venturi device (28) having an outlet opening (31) and suction openings (29) facing the liquid (32). In use, pressurized gas urges an inner liquid surface (46) downwards in the distributor means (14), until the liquid surface (46) reaches and exposes the uppermost inlet opening or openings (64). The gas is then forced through respective venturi device (28) at a pressure drop corresponding to the height difference (h) between the inner liquid surface (46) and respective outlet opening (31). Full working pressure is always obtained and the number of operating venturi devices is automatically adapted to the incoming gas flow by rising and lowering the inner liquid surface (46).

10 Claims, 6 Drawing Sheets

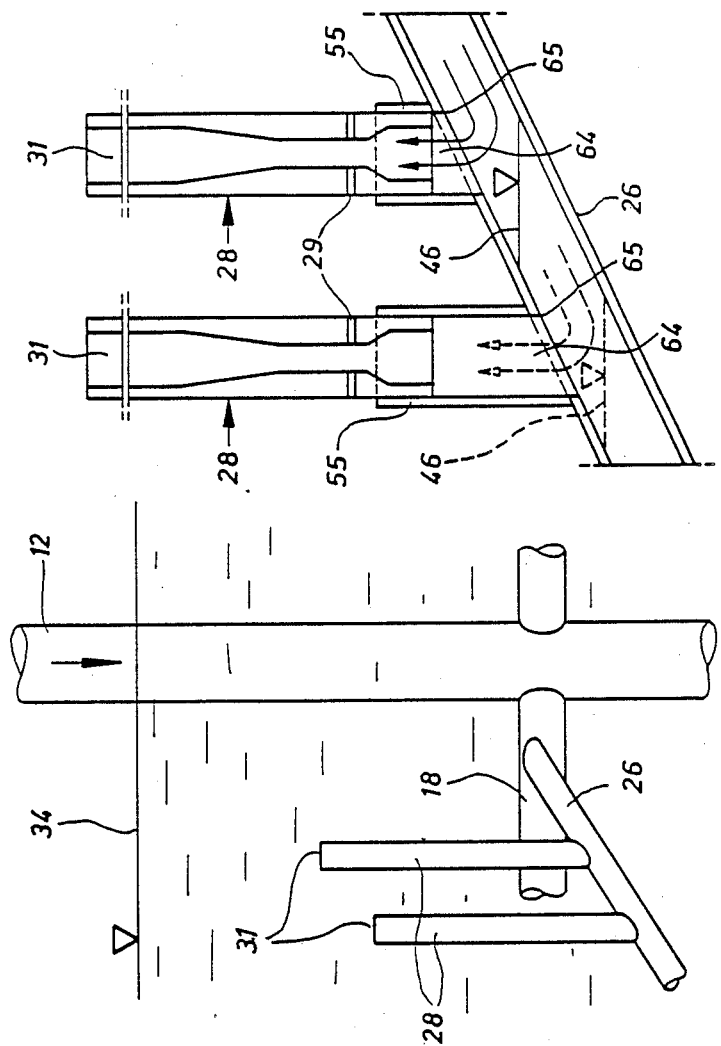

METHOD AND APPARATUS FOR CLEANSING GASES

The present invention relates to a method for cleansing gases from solid, liquid and/or gaseous impurities. The invention also relates to apparatus for carrying out the method.

The invention is particularly intended for use as a passive emergency system capable of being activated in the event of an accident or in the event of interruptions in operations in, for example, nuclear power plants, chemical industries or other industries where such circumstances may result in the release of airborne contaminants dangerous to the health. The invention, however, can also be applied under normal operating conditions, for instnce, in a plant or manufacturing process.

The invention is based on the concept of passing the contaminated gas beneath the surface of a liquid bath and cleansing the gas during its passage through the bath. Such an arrangement is particularly suited as a passive emergency system, since it can be permanently held in readiness for automatic and immediate functioning without needing to take special activating measures.

Gas cleaning apparatus in which gas is passed beneath the surface of the liquid bath and allowed to perculate through a multiple of openings or nozzles are known to the art. These known cleansing apparatus or arrangements, however, have poor cleansing effect. For example, in some cases the bubbles passing through the liquid bath are so large as to impair the contact between liquid and gas. On the other hand, in those cases where smsall bubbles are ejected into the liquid, the bubbles remain in the liquid for a very long period of time, which means that the cleansing apparatus must be given extremely wide surfaces in order to be able to deal with the prevailing gas flow. Such cleansing apparatus become very expensive and have unreasonable large dimensions, particularly in the case of large gas flows.

There is proposed in German Patent Specification No. 228 733 a cleansing system in which the incoming gas flow is divided into a plurality of part flows which are directed in fine jets against impingement or striking surfaces. This system, however, has the aforesaid drawback of having low efficiency at small rates of flow, since in this latter case the gas bubbles through the liquid in relatively large bubbles and is relatively unaffected.

U.S. Pat. Nos. 3,216,181 (see FIG. 4); 3,520,133 (see FIG. 7); and 4,182,617 (see FIG. 2) teach wet cleansing systems in which the gas is introduced beneath the surface of a liquid bath through a plurality of apertures located at progressively deeper depths. In use, the incoming gas forces down the level of liquid in the inlet conduit with increasing gas flow rates and inlet pressures, until the first outlet aperture is exposed and the gas is able to flow up through the liquid. As the gas flow rate and inlet pressure increase, the liquid surface is pressed down progressively still further, so as to expose more and more of the outlet apertures, such that gas is able to flow therefrom in the form of part gas-flows. In this way at least substantially all flow will pass through the outlet aperatures utilized, irrespective of the inlet pressure and the total flow through the gas cleansing system.

One drawback with such known gas cleansing systems is that when the surface of the liquid in the inlet conduit is pressed down beneath an inlet aperture, the gas will be forced out into the cleansing bath at a low energy level and in the absence of pressure drop. The gas will therefore stream out and up through the liquid in the form of relatively large bubbles, resulting in relatively poor separation of fine particles and gaseous contaminants. Such known cleansing systems are therefore not totally satisfactory as passive emergency systems intended for separating highly toxic particles from contaminated gas flows in, e.g., the event of an accident in a nuclear power plant.

The objective of present invention is to provide an improved gas cleansing method of the aforesaid kind which affords intimate contact between gas and cleansing liquid and a high cleansing efficiency both at partial load and at full capacity, and with which a high capacity can be achieved within a small apparatus volume. A further object of the invention is to provide a gas cleansing apparatus for carrying out the method.

These objectives are realized by means of a method according to the invention apparatus for carrying out the invented method.

According to one paricularly advantageous embodiment of the invention the outlet nozzles are in the form of venturi nozzles having walls which present suction openings to the surrounding liquid bath. This obviates the need of providing separate cleansing liquid inlet pipes and guarantees a constant and positive supply of liquid to the venturi nozzles.

When practising the method according to the invention and using the invented apparatus, high cleansing efficiency is constantly achieved irrespective of the magnitude of the total gas flow. Because the contaminated gas is caused to pass through first inlet orifices located at progressively increasing depths beneath the surface of the liquid and then through outlet orifices located at considerable heights above corresponding inlet orifices, it is guaranteed that the contaminated gas will constantly pass through the outlet nozzle at a considerable drop in pressure corresponding to the difference in the height between inlet orifice and outlet orifice. In this way the gas passing through the last of the outlet orifices utilized will also be subjected to a considerable drop in pressure and will therewith be cleansed effectively.

The invention will now be described in more detail with the aid of non-limiting exemplifying embodiments and with reference to the accompanying drawings. In the partially schematic drawings.

Figure 2:
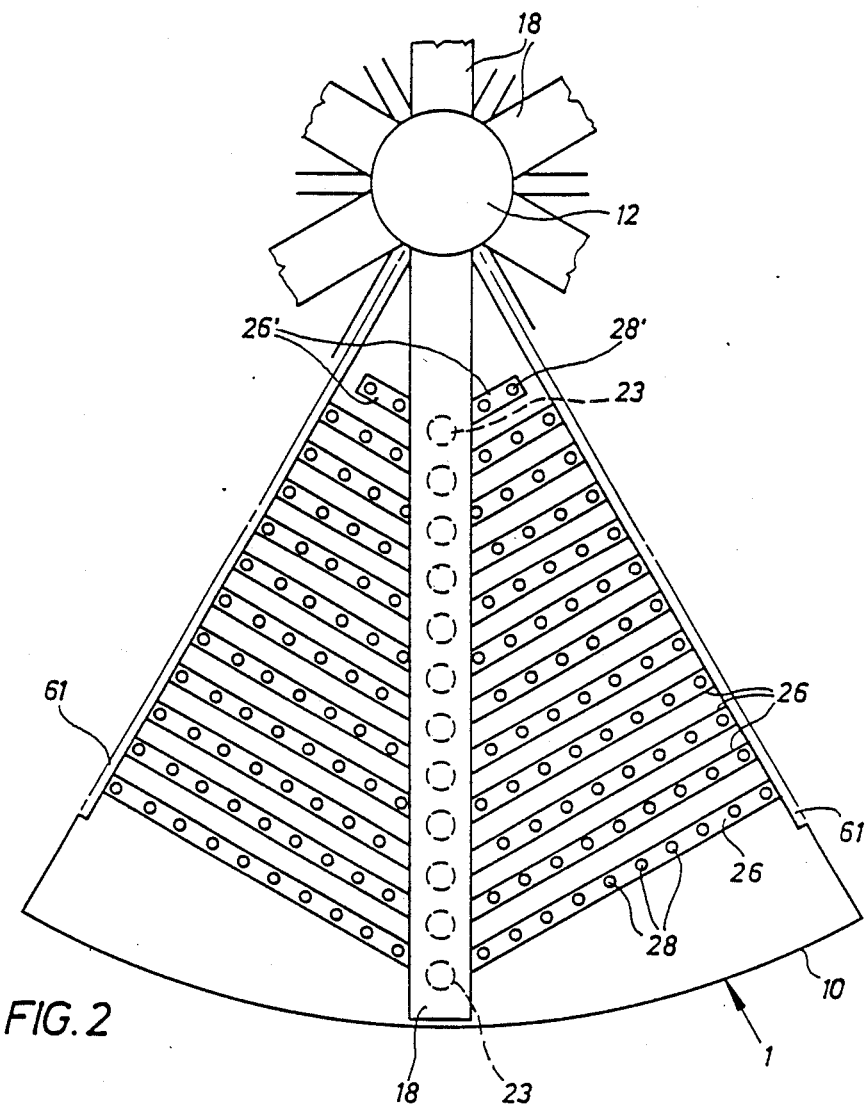
FIG. 2 is a plan view of a distributer segment provided with venturi nozzles and forming part of the gas cleansing arrangement in FIG. 1.
Figure 3:
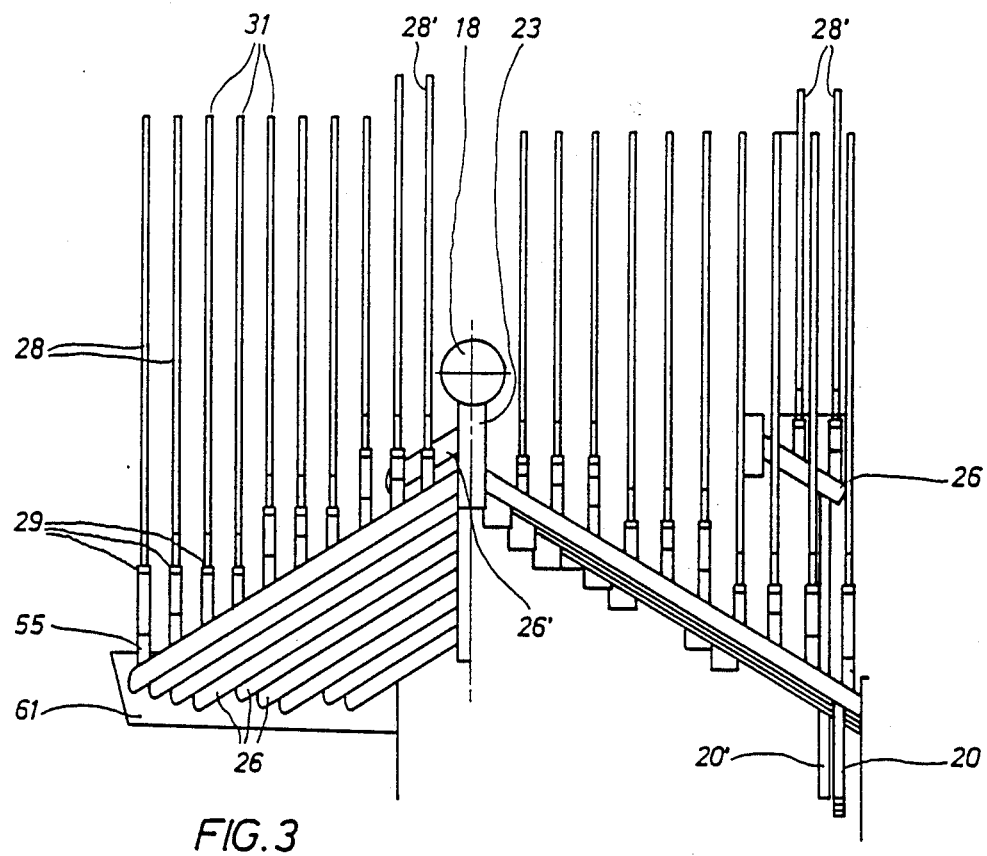
FIG. 3 is a side view of the distributor segment shown in FIG. 2.
Figure 8:
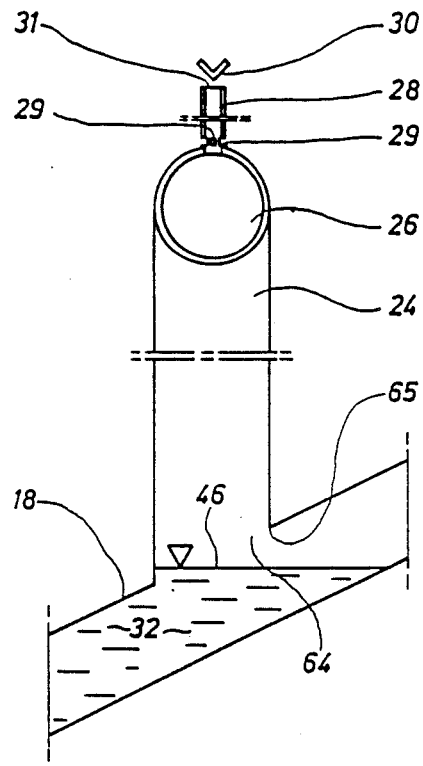
Figure 6:
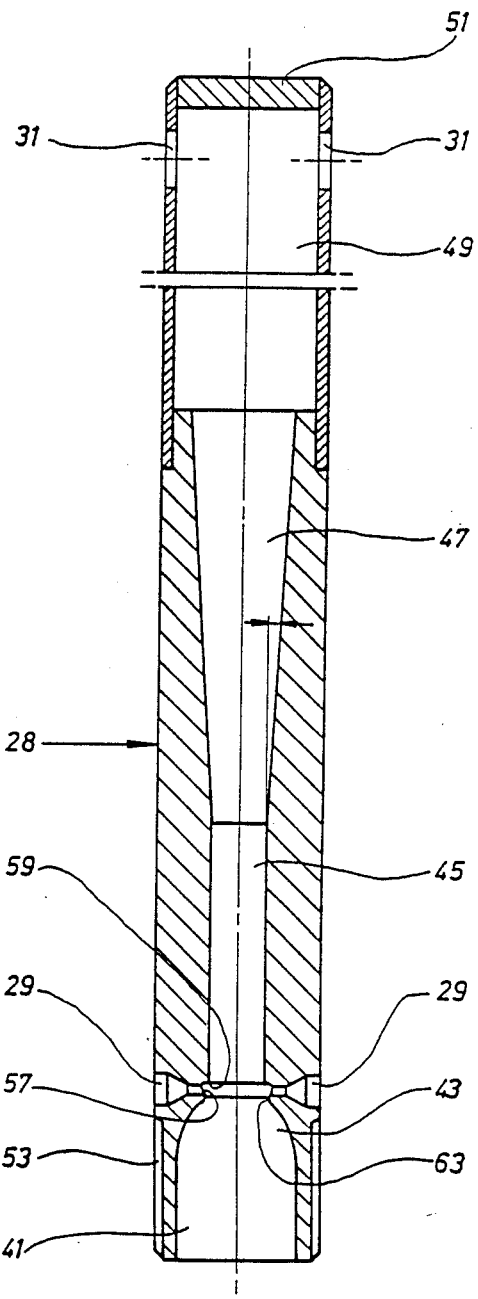
Figure 7:
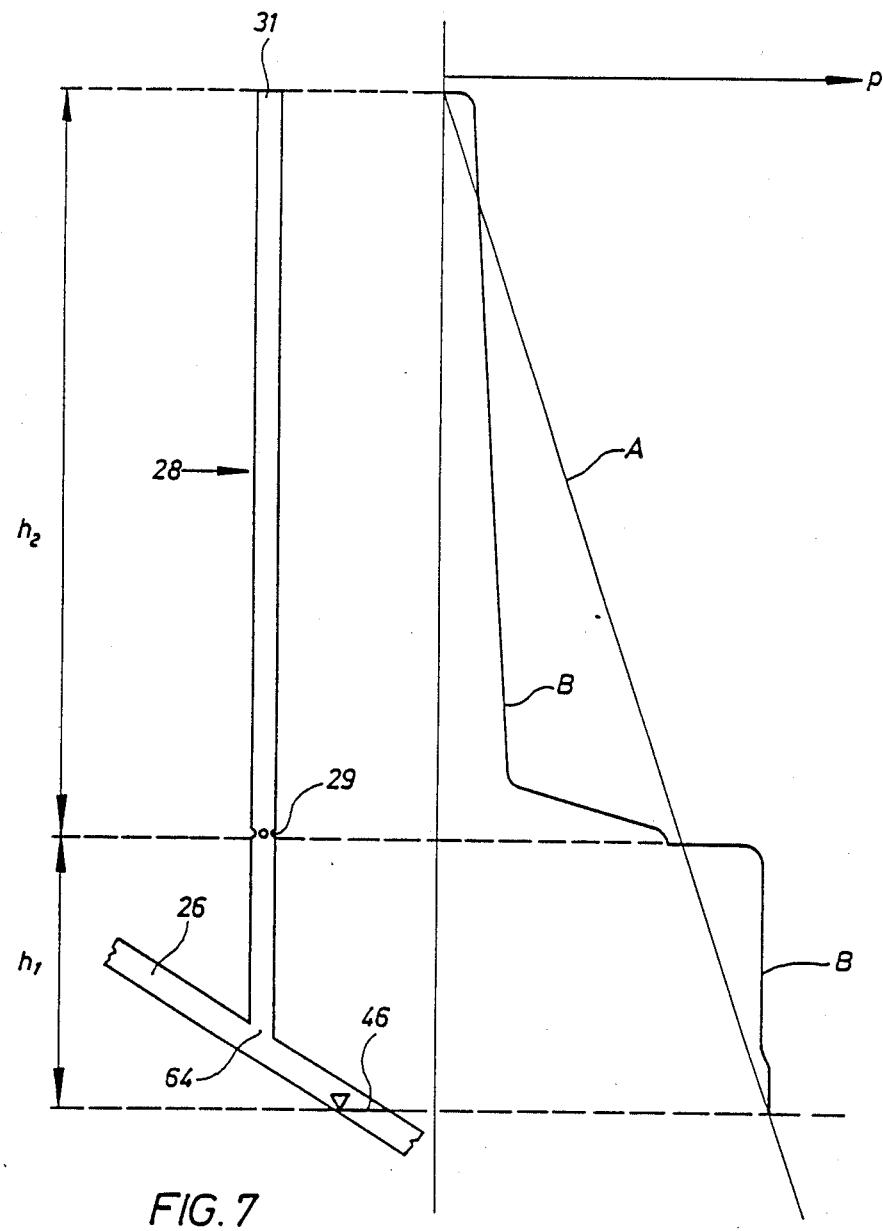

FIG. 4 illustrates a component part of an alternative embodiment of the distributor segment illustrated in FIGS. 2 and 3, FIG. 5 is a cut-away detailed view of two mutually adjacent venturi nozzles intended for mutually different inlet depths, FIG. 6 illustrates in larger scale a component part of a venturi nozzle according to the invention, FIG. 7 is a diagram showing the pressure ratios in a venturi nozzle surrounded by liquid, and FIG. 8 illustrates an alternative embodiment which comprises diffusion means located forwardly of, or upstream of the venturi nozzle.

Figure 1:
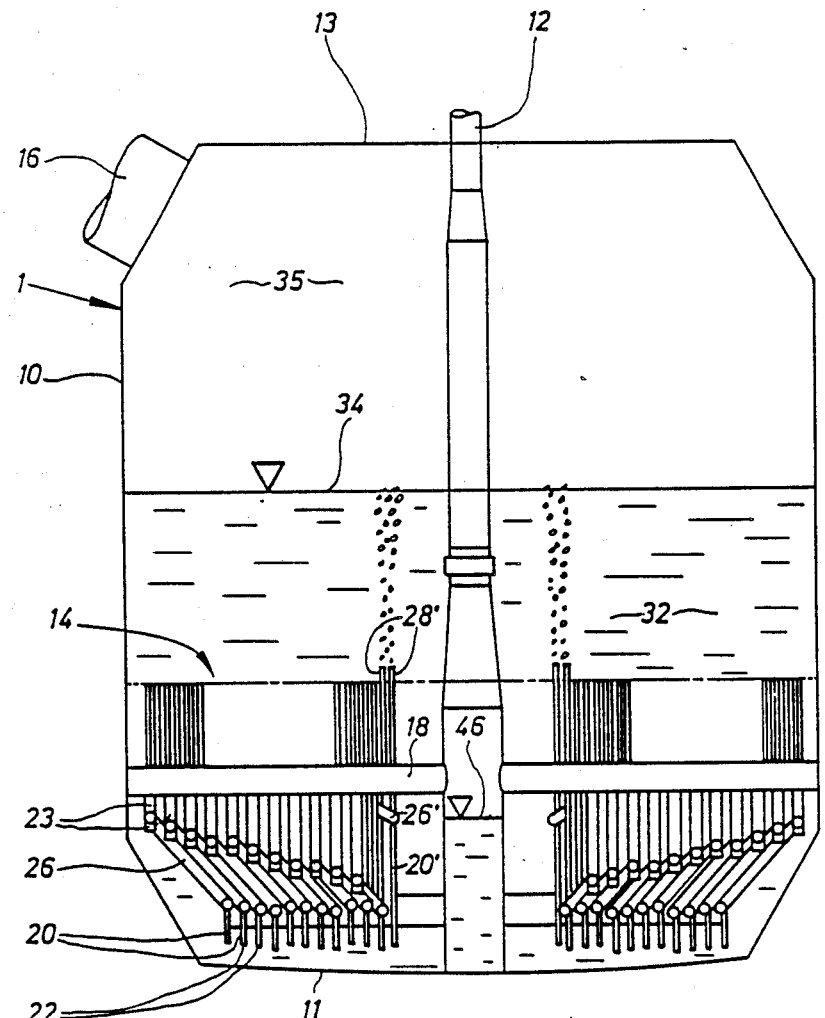
FIG. 1 illustrates schematically and in vertical section a gas cleansing arrangement according to the invention.

The drawings illustrate highly schematically a gas cleansing arrangement according to the invention. As illustrated in FIG. 1, the gas cleansing arrangement comprises a vessel, preferably a pressure vessel 1, having an outer wall 10, a bottom wall 11 and a cover 13 provided with an inlet 12, and further comprises a distributor 14 for distributing contaminated gas entering the vessel, and an outlet 16 for cleansed gas. The distributor is divided into a multiple of sections, the incorporating primary distributor pipes 18 extending radially and horizontally from the inlet. The pipes 18 have connected thereto downwardly extending connector pipes 23 each having two obliquely and downwardly extending, approximately transversal distribution pipes or side pipes 26. The side pipes 26 present at their free ends a downwardly and vertically extending pipe section 20 having a free opening 22. Any condensation that forms is able to pass out through the openings 22 and washing or cleansing liquid is able to pass up through the openings into the distributor 14 with decreasing gas flow. Arranged in approximate uniform spaced relationship on the distribution pipes 26 is a multiple of vertically upstanding venturi nozzles 28 which have inlet opening 64 facing the distribution pipes. Each of the venturi nozzles 28' presents at its lower part cleansing-liquid suction openings 29 and at its other part outlet openings 31 for processed gas. The construction of the venturi nozzles will be described in more detail hereinafter.

As illustrated in FIG. 1, the distributor 14 is intended to be lowered into a liquid bath 32 to a given depth beneath the surface 34 of the bath. The majority of the outlet openings 31 of the venturi nozzles 28, preferably all are located at the same level and preferably at a distance from the bath surface of at least approximately 0.5 m, particularly approximately 2 m. In other embodiments, however, it may convenient to locate the outlet openings above the surface of the liquid bath. It may, on occasion, be beneficial to place the outlet openings close to the cover 13 of the vessel 1 and to locate the outlet 16 closer to the surface 34. The inlet openings 64 for passing contaminated gas to respective venturi nozzles 28 are located approximately 1 meter or more beneath the outlet openings 31 or under the surface 34, if the nozzles end over said surface. Because of this difference in height there is always obtained a satisfactory cleansing effect with each venturi nozzle, immediately contaminated gas enters the downwardly located inlet opening 64 of the nozzle. The contaminants or impurities are extracted during passage through the venturi pipe with the aid of liquid sucked through the suction openings 29, this liquid being entrained in droplet form by the gas. The liquid droplets laden with contaminants are, in turn, extracted from the gas, partly as a liquid film on the inner surface of the outlet pipes 49 of the venturi nozzles 28 and partly during passage between the outlet openings 31 and the bath surface 34. Wnen extracting droplets during passage through liquid, a given smallest height difference is required in order to achieve satisfactory separation. Further extraction or separation can take place above the surface 34 and/or in a downstream separator (not shown) described hereinafter.

For the purpose of ensuring smooth start conditions at the initial stage of release through the gas cleansing arrangement without any shock loads, each section comprises two highly located, short side pipes 26' with venturi nozzles 28' which are located at a higher level and which discharge above the remaining nozzles. The downwardly extending pipe sections 20' of the side pipes 26', however, extend to the same level as remaining pipes sections 20. The distributor is also constructed such that the openings 64 to the venturi arrangement 28 lie at progressively increasing depths, thus the number of active separators increases continuously with increasing gas flows.

Located above the surface 34 of the bath is a gas space 35 which communicates with the outlet 16. The space 35 is dimensioned to take up the increase in bath volume resulting from the generation of bubbles in the bath as gas flows therethrough, and also from the condensate that forms when the contaminated gas is warm and moist. The outlet 16 communicates with atmosphere via a separator means for separating liquid or mist droplets remaining in the gas. This separator means may be of any suitable kind, e.g. cyclones or chambers filled with gravel and stone. The separator means may also comprise a combination of known separator devices.

The gas cleansing arrangement operates in the following manner. When no load is applied, washing liquid enters through the openings 29, 31 of the venturi nozzles 28 and the bottom openings 22, such that an inner liquid surface 46 in the disributor 14 and the inlet pipe 12 takes the same level as the outer liquid surface 34. The gas cleanser now has a water-seal function. In the event of a disturbance in plant operation in which gas is released, the pressure increases and the inner liquid surface 46 is forced down until it lies beneath a threshhold 65 adjacent the highest inlet opening or openings 64 of the venturi nozzles 28. The gas then passes out through these venturi nozzles, and finely atomized liquid droplets are sucked in during passage past the inlet openings 29. Solid, liquid and gaseous contaminants are absorbed by the liquid droplets drawn by suction into the gas stream. In a second separation stage effected upon passage of the gas between the openings 31 of the venturi nozzles and the bath surface 34, the gas is further cleansed through a scrubber-bottle effect, at which the liquid droplets laden with contaminants, dust particles and gaseous impurities are taken-up by the washing liquid. Droplets are already extracted to a certain extent in the pipe 49, in the form of a film on the inner surface of the pipe. A third cleansing stage is provided in the aforesaid downstream separator means, not shown.

The extraction of gaseous contaminants can be greatly enhanced by using a washing liquid that has a composition such as to ensure that chemical reactions will rapidly consume, i.e. react with, ions dissolved in the liquid (so-called chemical amplification). For example, the extraction of gaseous acid components can be enhanced with a washing liquid that has alkaline components dissolved therein. The absorption of gaseous iodine can be facilitated by mixing sodiumthiosulphate in the washing liquid.

The various sections may have arranged therebetween radial partition walls. These may have the form of radial partition walls 61, to which the ends of the side pipes 26 are attached. This affords additional stability to the construction. Optionally, such a radial partition wall 61 may be hollow and open downwardly and towards the distributor pipes 26. This then serves as a lower inlet opening 22 for washing liquid.

FIG. 4 illusttrates a modified embodiment of the invention in which the distribution or side pipes 26 extend directly from the main pipes 18 in the absence of intermediate vertical connecting pipes 23.

FIG. 8 illustrates a further embodiment of the invention, in which the main pipes 18 extend obliquely downwards and present a multiple of upwardly directed riser pipes 24 having extending therefrom substantially horizontal distribution pipes 26. The venturi nozzles 28 are arranged on the distribution pipes 26. Located above the outlet openings 31 of the venturi nozzles 28 are diffuser means or spreader means 30. When the exiting gas strikes against the diffusor means, the gas is broken up into small gas bubbles, therewith providing better separation of contaminants from the gas during its passage through the liquid bath. In this embodiment it is necessary for the inner liquid surface 46 in the main pipes 18 to lie beneath a threshold edge 65 in the lower opening 64 of the riser pipes 24, so that the contaminated gas is able to flow out through the venturi nozzles 28. In this way all nozzles on the same riser pipe will begin to operate essentially at the same time. The riser pipes 24 of different main pipes 18 may conveniently be located at mutually displaced levels, so that not all riser pipes in one and the same pipe ring will begin to operate at the same time.

A preferred embodiment of a venturi nozzle for a gas cleansing arrangement according to the invention is illustrated in FIG. 6. The venturi nozzle comprises an inlet part 41, a tapering constriction 43, a cylindrical throat 45, a conically flared part 47 and a cover 51, and laterally directed outlet openings 31 arranged beneath the cover. The venturi nozzle has at its lower end a screw thread connection 53, for fitting the nozzle to an upstanding connection pipe 55 on respective side pipes 26 (see FIG. 5). Located between the constriction 43 and the throat 45 is an annular groove 57 which has a sharp edge 59 facing the throat 45. The suction openings 29 discharge into said groove 57, wherewith the liquid entering the groove is able to distribute itself circumferentially therearound.

The groove 57 suitably has an axial extension of 2–4 mm, and the groove adge 63 facing the constriction 43 has a radius which is 0.5 to 1.0 mm greater than the radius of the groove edge 59. The tangent to the wall of the constriction adjacent the groove edge 63 therewith passes externally of the groove edge 59. When gas passes through the venturi nozzle, liquid is drawn by suction into the groove 57 and is torn loose upstream of or adjacent the sharp edge 59, in the form of fine liquid droplets. The contaminants in the gas are taken-up by these liquid droplets, during passage through the throat 45, the conically flared section 47 and the upper part 49. The device is thus a self-suction venturi separator. According to the invention, at least 0.5 kg, and preferably of liquid, e.g. water, per cubic meter of gas processed shall be drawn by suction through the suction openings 29 and into the venturi nozzles 30. Consequently, the suction openings 29 and the grooves 57 are dimensioned such that the desired quantity of liquid will be sucked in at the given pressure drop. The minimum pressure drop in each venturi nozzle respectively is determined by the level differential between the corresponding lower opening 64 and the outlet opening 31 or the liquid surface 34, whichever is the lowest. A pressure drop of 1 m water-column or more is required in the majority of cases in order to obtain satisfactory cleansing of the gas. A pressure drop of about 1.5 m is preferred.

In the illustrated embodiment, the throat has a diameter of 10 mm and the upper part 49 a diameter of 26 mm. It has been found that in order to achieve a high degree of cleansing, the throat diameter should not exceed about 30 mm.

FIG. 7 is a schematic diagram illustrating the dependency of pressure on the depth in the liquid and within the venturi nozzle. In this regard the straight curve A represents the hydrostatic pressure in the liquid and the irregular curve B represents the pressure in differentt parts of the gas channel. The pressure drop in the convergent part 43 of the venturi arrangement determines essentially the magnitude of the gas flow through the venturi. The amount of liquid sucked in depends, inter alia, on the pressure drop in the venturi downstream of the suction openings 29. It will be seen from the Figure that the pressure drop in the gas channel between the distributor opening 64 and the suction openings 29 must exceed slightly the hydrostatic pressure drop in the liquid (the height $h_1$) if liquid is to be sucked in, and that the pressure drop downstream of the suction openings 29 in the gas channel must be smaller than the corresponding hydrostatic pressure drop in the liquid bath (the height $h_2$). It will be seen hereform that pipes 49 of increased length will provide more liquid per gas volume if the venturi is not changed, whereas shorter pipes will provide less liquid. Experience has shown that the pipes 49 should preferably have a length which exceeds the height at which the suction openings 29 are located above the distributor opening 64.

The invention is not restricted to the illustrated exemplifying embodiments, and the features described with reference to and/or illustrated in the drawings can be combined in any suitable manner within the scope of the invention as defined in the following claims. It is emphasized here that the term venturi arrangement or device or venturi nozzle (referenced 28) shall be interpreted in its widest meaning, namely to include means provided upstream of and downstream of the actual venturi part, to form flow passage or gas channels between the inlet openings 64 and the outlets openings 31.

We claim:

1. A method for cleansing a gas from contaminants by passing the contaminated gas through venturi devices (28) beneath the surface (34) of a bath (32) comprising a cleansing liquid, and by causing liquid to be drawn by suction from the liquid bath into the flowing gas as a result of the decrease in pressure taking place as the speed of the gas through the venturi devices increases, comprising the steps of dividing the contaminated gas into a plurality of part flows by causing the gas to pass from a downwardly extending distribution pipe into a plurality of venturi devices, each through an inlet orifice (64) situated at a different depth beneath the surface (34), the liquid level within said distribution pipe being changed by changing inlet pressure of the contaminated gas such that at increased inlet pressure an increased number of venturi devices (28) will be operative, causing the liquid sucked into the venturi device to fully embrace the gas part flow and extract the contaminants from the flow, causing the contaminated gas, subsequent to its division into part flows, to flow substantially vertically upwards through the bath, separating the contaminant-laden liquid from the gas, and discharging the gas from above the bath.

2. A method according to claim 1, wherein the suction draws at least one kg of liquid per cubic meter of contaminated gas into the venturi device and mixes the liquid with the gas.

3. A method according to claim 1 wherein the gas is caused to rise through the bath in bubble form in the last part of the distance between the surface (34) and the location at which the liquid is drawn into the gas.

4. Apparatus for cleansing a gas, comprising a vessel (1) adapted to be partially filled with a bath (32) of cleansing liquid to provide a surface (34), an inlet (12) for contaminated gas and an outlet (16) for cleansed gas, the inlet (12) being connected to a distributing means (14) with a plurality of orifices (64) and outlet nozzles designed as substantially vertical venturi devices (28) which are located beneath the surface (34), each of said venturi devices having an axis of symmetry with a throat and a plurality of suction openings (29) opening into said bath and located adjacent the throat (45) of the associated venturi device (28) and a venturi outlet in said vessel whereby said gas flow passes through said distributing means, through said outlet nozzles and from said nozzles through said vessel outlet, and an annular groove (57) having upstream and downstream edges provided in the inner wall of the venturi device (28), the downstream edge (59) being sharp, the diameter of which is smaller than the upstream edge (63).

5. Apparatus according to claim 4, wherein the throat (45) of each venturi device (28) has a diameter smaller than 30 mm and a length which is from 1 to 7 times its diameter.

6. Apparatus according to claim 4, wherein the outlets (31) are located beneath the surface (34) of the bath (32).

7. Apparatus according to claim 4 wherein the venturi devices extend through the surface (34) of the bath (32) and terminate in outlets (31) located above the surface (34) of the bath (32).

8. Apparatus according to claim 4, wherein the venturi devices (28) include pipes (49) which are located at the downstream end and which present said venturi outlets (31), and in that the vertical distance from said outlets (31) to the suction openings (29) is greater than the vertical distance from the suction openings (29) to corresponding inlet orifices (64) in the distributing means (14), and that the venturi devices (28) are connected to the inlet orifices (64) and are able to be closed off by the liquid bath, said inlet orifice being situated at least about 1 m beneath the surface of the corresponding outlets (31) and the surface of the liquid bath (32).

9. Apparatus according to claim 8, wherein the pipes (49) located at said downstream end are cylindrical and teminated axially with a cover (51); and the outlets (31) are arranged in the cylindrical surfaces of the pipes (49) and the pipes (49) are arranged substantially vertically.

10. Apparatus for cleansing a gas, comprising a vessel (1) adapted to be partially filled with a bath (32) of cleansing liquid to provide a surface (34), an inlet (12) for contaminated gas and an outlet (16) for cleansed gas passing out through the bath, the inlet (12) being connected to a distributing means (14) having downwardly extending connector pipe means with a plurality of orifices (64), said orifices being situtated at different depths below the surface, said connector pipe means having a free opening into the bath below the level of the deepest orifice to enable liquid to pass up the connector pipe means and sequentially cover the orifices with decreasing gas flow, and outlet nozzles designed as substantially vertical venturi devices (28) which are located beneath the surface (34), each of said venturi devices having an axis of symmetry with a throat and a plurality of suction openings (29) opening into said bath and located adjacent the throat (45) of the associated venturi device (28), and a venturi outlet within said vessel whereby said gas flow passes thorugh said connector pipe means, through said outlet nozzles and from said nozzles through said vessel outlet.

* * * * *